United States Patent [19]

Sowers et al.

[11] 4,413,099

[45] Nov. 1, 1983

[54] POLYMER COMPOSITION AND PROCESS FOR PREPARING SAME

[75] Inventors: Edward E. Sowers, Mooresville; Gerald L. Goe, Greenwood; Michael L. Prunier, Greenfield, all of Ind.

[73] Assignee: Reilly Tar & Chemical Corp., Indianapolis, Ind.

[21] Appl. No.: 301,040

[22] Filed: Sep. 10, 1981

[51] Int. Cl.$^3$ .................................................. C08F 8/04
[52] U.S. Cl. .................................. 525/327.1; 525/339
[58] Field of Search ............... 526/265; 525/336, 338, 525/339, 327.1

[56] References Cited

U.S. PATENT DOCUMENTS 2,723,258 11/1955 Price ..................................... 526/265
2,771,462 11/1956 Shen ..................................... 526/265
3,538,053 11/1970 Rembaum .............................. 526/265

OTHER PUBLICATIONS

A. Katchalsky et al., J. Polymer Science, vol. XXII, pp. 955–965, 1957.
Chem. Abs., No. 92:158965c, 1980, Shigematsu et al.

Primary Examiner—Paul R. Michl
Attorney, Agent, or Firm—Woodard, Weikart, Emhardt & Naughton

[57] ABSTRACT

A new polymer composition comprised substantially of monomeric units having the formula

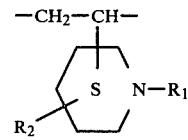

or its acid salt, wherein $R_1$ is an alkyl group having from 1 to about 20 carbon atoms or an arylalkyl group having from 7 to about 12 carbon atoms, and $R_2$ is hydrogen or an alkyl group having from 1 to about 10 carbon atoms. A process for preparing the new polymer comprising the step of hydrogenating the quaternary salt of the pyridine precursor of the polymer under mild reaction conditions and in the presence of a hydrogenation catalyst selected from the Group VIII metals. A further step for preparing the free base polymer from the acid salt by reacting the same under mild conditions with a basic material such as sodium hydroxide.

46 Claims, No Drawings

POLYMER COMPOSITION AND PROCESS FOR PREPARING SAME

BACKGROUND OF THE INVENTION

This invention relates generally to the fields of polymer and pyridine chemistry, and more specifically to new compositions of matter comprising N-substituted polyvinylpiperidines and to an efficient, high-yielding process for their preparation.

Pyridine, with its characteristic aromatic ring structure, much like benzene, is the parent ring system to a large number of substituted homologues and derivatives having uses both in naturally occurring products and valuable industrial, pharmaceutical and agricultural chemicals. Piperidine, being one such derivative with the formula $C_5H_{11}N$, is a completely saturated ring compound recognized for its strong basicity and solubility in solvents such as water, alcohol and benzene. Common uses reported for piperidines are many and varied, including solvents and intermediates, curing agents for rubber and epoxy resins, catalysts for condensation reactions, and ingredients and oils in fuels and the complexing agents. Substantial work, both in industry and in academia, has been done with pyridines, piperidines and related compounds over the years. One aspect of this work has involved the use of pyridines as bases for synthesis of polymeric materials. In this regard, poly-2 and poly-4 vinylpyridine have been commercialized as valuable vinyl-type polymers for such uses as photographic dye mordants, tablet coating materials, and various uses in the textile and paper industries. These substances are marketed as linear and as cross-linked polymers and exhibit differing properties, such as their respective solubility and insolubility in organic solvents such as water, isopropyl alcohol and aqueous mineral acid. These substances also show up in copolymer structures as with styrenes.

One might expect polymer chemistry to have advanced in like fashion with piperidine-base materials. However, this is not the case. Although 2- and 3-vinylpiperidine have been reported synthesized in monomeric form, for example, poor yields, if any, have been reported in attempts to prepare their polymeric counterparts. A. Ladenberg, Ber., 22, 2583 (1889); A. Ladenberg, Ann., 301, 129 (1898); R. Merchant, C. S. Marvel, J. Am. Chem. Soc., 50, 1197 (1928); H. A. Iddles, E. H. Lang, D. C. Gregg, ibid., 59, 1945 (1937). Applicants have also encountered problems with their attempts to directly prepare and polymerize these monomers.

Only one reference is known to applicants which suggests an alternate synthesis of these polyvinylpiperidines. That reference is A. Katchalsky, K. Rosenheck, B. Altmann, J. Polymer Sci., vol. XXII, pp. 955–965 (1957). It suggests hydrogenating either poly-2-vinyl- or poly-4-vinylpyridine in solution in glacial acetic acid using 5% palladium on charcoal as a catalyst. Full reduction was reported after 20 hours of hydrogenation at an initial hydrogen pressure of about 3,500 p.s.i. and at a temperature of 220°–250° C. In applicants' efforts to reproduce these results, applicants found the reaction conditions of the reference to be so harsh as to be barely susceptible of laboratory testing, and doubtful that the process would have any commercial application. In attempting to hydrogenate using the reference procedure under conditions of up to 200° C., initial hydrogen pressures of up to 2,000 p.s.i.g. and reaction periods up to 12 hours, applicants were only able to evidence a maximum of about 50-60% hydrogenation. This is an unacceptable percentage for commercial application as the differing characteristics of both the starting pyridine and ending piperidine polymers will be present in the reaction product. Moreover, the corrosive atmosphere created by the use of acetic or any acid under these conditions causes a hazardous environment, both for workers and for equipment, significantly undercutting any commercial potential for the process. In addition, even if the reference procedure is enabling at its more harsh conditions not tried by applicants, the reference itself reports significant degradation of the polymers causing substantial reductions in molecular weights in all but the very smallest starting materials.

Aside from this Katchalsky et al. reference which was published in 1957, applicants are aware of no publication reporting synthesis of these or other polyvinylpiperidines or teaching a procedure for their preparation. Applicants are also aware of no commercial use or availability of these polymers. Nonetheless, the need for such strong bases in polymeric form has continued to increase, and exists today. If available, substituted forms of these polymers would also have existing and potential uses both as intermediates and as end products for use with epoxy resins, urethane foams and others.

SUMMARY OF THE INVENTION

As one aspect of applicants' invention, a new polymeric composition of matter has been synthesized comprised substantially of monomeric units having the formula

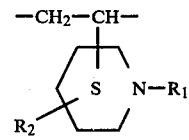

or its acid salt, wherein $R_1$ is an alkyl group having from 1 to about 20 carbon atoms or an arylalkyl group having from 7 to about 12 carbon atoms, and wherein $R_2$ is hydrogen or an alkyl group having from 1 to about 10 carbon atoms. The preferred polymeric compositions prepared to date within this class are
poly-2-vinyl-1-methylpiperidine,
poly-4-vinyl-1-methylpiperidine,
poly-5-vinyl-2-methyl-1-methylpiperidine and
poly-2-vinyl-5-ethyl-1-methylpiperidine.

As a second embodiment of applicants' invention, a process for preparing these N-substituted polyvinylpiperidines or their acid salts has been discovered comprising the first step of hydrogenating an amount of the quaternary salt of the pyridine precursor of the polymer in the presence of a hydrogenation catalyst selected from the Group VIII metals. In its preferred form, this reaction proceeds under mild conditions at temperatures of about 100°–200° C. and actual operating pressures of about 300–3,000 p.s.i.g. With periods of reaction of only about 4–8 hours, this preferred process has achieved in excess of about 90% hydrogenation thereby evidencing substantial advantages over what has been reported in the past. Moreover, it proceeds in a nonacid solvent, such as water or an alcohol, and through preliminary evaluations, appears to be carried out without significant reduction of molecular weight in the polymer molecules. The free base of a particular piperidine polymer is then prepared by reacting an amount of its acid salt with a basic material. In its preferred form, this neutralization reaction also proceeds under mild conditions to achieve high yields in short reaction times.

Related objects and advantages of the present invention will be apparent from the following description.

DESCRIPTION OF THE PREFERRED EMBODIMENT

To better understand the disclosure herein and the scope and breadth of applicants' invention, certain conventions need be understood. First, pyridine is characterized by the formula $C_5H_5N$, and has an aromatic ring structure similar to that of benzene. Its structure is depicted in one of two ways, either by specifically drawing three double-bonds in the ring or by representing those double bonds with a circle. The latter convention is used by applicants in this application. Second, piperidine is a saturated ring structure having the formula $C_5H_{11}N$ and having no ring double bonds. The common convention, used by applicants in this application, to depict the saturated piperidine ring is to place a letter "S" within the ring structure. Third, the term "quaternary salt" is used in this application to indicate the condition of a pyridine compound under which the ring nitrogen atom carries an extra carbon-atom-containing substituent giving it a fourth bonding site. This is contrasted by usage of the term "acid salt" to indicate a pyridine or piperidine compound where the ring nitrogen atom carries an extra proton and thus a fourth bonding site because of its presence in an acid solution such as HCl. This gives the total molecular unit a positive charge depicted by a "+" in its structure, which is normally neutralized by the presence of an anion such as a halogen. Fourth, use of the term "substantially" in characterizing the monomeric units of applicants' new polymer is meant to indicate that the new polymer need not be entirely comprised of the stated monomer, but can have monomer units corresponding to those of the starting material or possibly impurities that become entrapped in the substance. As further discussed in connection with applicants' preferred processes, it is this substantial conversion of the starting material to the desired polymer, and not 100% conversion, that is needed to realize the beneficial results of applicants' discoveries.

As stated previously, one aspect of this invention comprises a new polymer composition of matter. That composition is comprised substantially of monomeric units having the formula

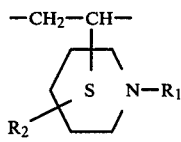

or its acid salt, wherein $R_1$ is an alkyl group having from 1 to about 20 carbon atoms or an arylalkyl group having from 7 to about 12 carbon atoms and wherein $R_2$ is hydrogen or an alkyl group having from 1 to about 10 carbon atoms. As to applicants' preferred polymers within this definition, these include
poly(4-vinyl-1-methylpiperidine),
poly(2-vinyl-1-methylpiperidine),
poly(5-vinyl-2-methyl-1-methylpiperidine),
poly(2-vinyl-5-ethyl-1-methylpiperidine) and their acid salts.

In this context, any salt known to a person of ordinary skill in this art is suitable and is understood as contemplated and within the scope of applicants' invention. These include halogen salts such as chloride, bromide and iodide as well as methylsulfate, carbonate and toluene sulfonate. A typical acid salt within this group is hydrochloride.

The polymer compositions within applicants' discovery have shown valuable utilities in preliminary experiments done to date, both as catalysts serving as hardening agents for epoxy resins such as those manufactured by the Dow Chemical Company, and as catalysts for the preparation of urethane foams used in upholstery materials. Other utilities for these polymers are anticipated in the textile industry, as valuable intermediates in commercial and laboratory applications and as acid acceptors in view of their strong basicity, polymeric form and versatility provided by the substituted ring nitrogen in the polymer backbone.

A second aspect of applicants' invention comprises a process for preparing the above-defined new polymer composition. More specifically, applicants first prepare the acid salt of the polymer, which is comprised substantially of monomeric units having the formula

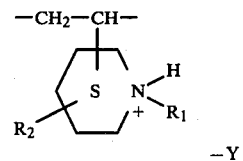

wherein $R_1$ and $R_2$ are as defined above and Y is an anion such as halogen. The preferred process for preparing the acid salt is the step of hydrogenating an amount of the quaternary salt of the pyridine precursor of the polymer in the presence of a hydrogenation catalyst selected from the Group VIII metals.

The precursor starting material for this reaction is also a polymer and is comprised substantially of monomeric units having the formula

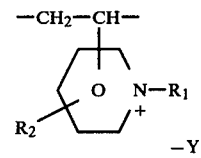

wherein $R_1$, $R_2$ and Y are the same as defined above. The particular precursor desired may be commercially available. If not, it is readily prepared by literature procedures, such as disclosed in *Jpn. Kokai Tokkyo Koho* 79,157,828, Shigematsu, Taichiro; Shibaura, Tetsuya; Naka, Tetsu; Teraoka, Toru; Mitsubishi Chemical Industries Company, Ltd.

As discussed previously in the application, the Katchalsky et al. reference had suggested hydrogenating a poly-2- or poly-4-vinylpyridine. However, the reaction taught in the reference required harsh conditions and produced poor yields in terms of percent hydrogenation of the starting material unless long reaction times up to 20 hours were observed. For example, the reference taught a temperature of 220°–250° C., and then stated at a later point that such high temperatures result in at least partial ring openings in the polymer chain as well as degradation and substantial reduction in the molecular weight of the hydrogenated polymer. The reaction was also reported to proceed at an initial hydrogen pressure of about 3,500 p.s.i. which means that operating pressures were significantly greater, in the range of 5,000–7,500 p.s.i. or higher. Acetic acid was also used in the reaction, even in view of its corrosive properties under those harsh reaction conditions.

Applicants have discovered that substantial advantages are obtained by hydrogenating the quaternary salt of a polyvinylpyridine. Although more harsh conditions can be used if desired, preferred temperatures of only about 100°–200° C. and preferred operating pressures of only about 300–3,000 p.s.i.g. are successfully used. Similarly, although reaction times of 24 hours or more are possible, preferred times of only about 4–8 hours are needed in the presence of a nonacid, noncorrosive solvent such as water or an alcohol in order to achieve substantial hydrogenation of the starting polymer. From testing to date, there also appears to be little, if any, limitation on molecular weight of the polymer, with molecular weights of about 1,000 or more being readily used. Moreover, with applicants' milder reaction conditions and from preliminary evaluations which have thus far been performed, there appears to be no significant degredation or reduction in the molecular weight of the starting polymer after hydrogenation.

As for the preferred catalyst used in applicants' process, applicants' experiments to date have shown that all Group VIII metals generally known by those skilled in the art to have hydrogenating properties have tested out to produce at least some degree of hydrogenation in the reaction. This group includes nickel, palladium, ruthenium, rhodium and platinum, and will be referred to hereafter for the purpose of this application as the Group VIII "hydrogenation catalysts." Within this group, applicants' testing has shown that nickel and ruthenium produce significantly better results in terms of percent hydrogenation of the starting material than the other named hydrogenation catalysts. By "significantly better", it is meant that reaction products evidencing at least about 90% hydrogenation have been prepared using the nickel and ruthenium catalysts under applicants' preferred reaction conditions. As mentioned earlier in the application, complete hydrogenation is not required for many purposes, although applicants' work has shown that hydrogenation of about 80% or more is required to achieve the advantages and utilities of applicants' new polymer composition.

The free base of applicants new N-substituted piperidine polymer is then prepared by neutralizing the acid salt of the polymer prepared during hydrogenation. In applicants' preferred process, this neutralization is accomplished by the step of reacting the acid salt of the polymer with a basic material. In this context, "basic material" is meant to indicate a strong base such as an ionization resin or an alkali hydroxide, with sodium and ammonium hydroxide being the basics of choice. The importance of this material is that it be sufficiently basic to provide the impetus for neutralizing the acid salt and freeing the polypiperidine base.

The reacting step of the preferred process includes the step of combining the acid salt with the basic material and then causing the resultant mixture to be at a temperature sufficiently high and for such length of time as to cause substantial neutralization to occur. No specific temperature or temperature range is involved, although experiments would indicate the preferred range to be about 5°–150° C., with the most preferred temperature range about 25°–50° C. Testing has also shown the internal pressure can vary from about atmospheric to about 200 p.s.i.g., with any change naturally affecting both the time and temperature of the reaction. For commercial application of the polymer compositions in question, the causing step need be for a period of time sufficient to provide a yield of at least about 80% free polypiperidine base. Testing has shown these yields are achieved with periods from about 30 minutes to 12 hours depending, of course, upon many factors.

For the purposes of further promoting a better understanding of the composition and processes of applicants' present invention, reference will now be made in the examples below to the preparation of specific polymer compositions within the defined classification.

EXAMPLE 1

A mixture of 50 g of poly(4-vinyl-1-methylpyridinium chloride), 350 ml of water and 5 g of 5% ruthenium on carbon was pressurized with hydrogen to 600 p.s.i.g. and then heated to 175° C. Further hydrogen was added as necessary to keep the pressure above 1,000 p.s.i.g. During 7 hours the theoretical amount of hydrogen was taken up. The vessel was cooled and vented and the catalyst was removed by filtration. Evaporation of the solvent yielded a solid material which was identified as poly(4-vinyl-1-methylpiperidinium chloride). The n.m.r. spectrum of a solution of a sample of this material showed the absence of peaks in the region 6 to 9 p.p.m. downfield from tetramethylsilane, a region where peaks characteristic of pyridine rings appear in the spectrum of the starting material. Titration of a sample of the material with silver nitrate demonstrated that it contained 20.4% by weight of chloride.

EXAMPLE 2

A 15 g sample of the poly(4-vinyl-1-methylpiperidinium chloride) prepared as in Example 1 was dissolved in 200 ml of methanol and passed through a column of the ion exchange resin IRA 900, which is marketed by The Rohm and Haas Company, in its basic form. Evaporation of the solvent yielded a solid material which was identified as poly(4-vinyl-1-methylpiperidine). Titration of a sample of this material with silver nitrate demonstrated that it contained negligible chloride.

EXAMPLE 3

A mixture of 50 g of poly(4-vinyl-1-methylpyridinium chloride), 350 ml of water and 10 g of 5% palladium on carbon was pressurized with hydrogen to 500 p.s.i.g. and then heated to 175° C. Further hydrogen was added as necessary to keep the pressure above 1,000 p.s.i.g. During 18 hours 85% of the theoretical amount of hydrogen was taken up. The vessel was cooled and vented and the catalyst was removed by filtration. Evaporation of the solvent yielded a solid material. The n.m.r. spectrum of a solution of a sample of this material showed a considerably decreased relative intensity of the peaks in the region of 6 to 9 p.p.m. downfield from tetramethylsilane as compared with the spectrum of the starting material, demonstrating that most, i.e., over at least about 80%, of the pyridinium rings in the starting polymer had been reduced to piperidinium rings.

EXAMPLE 4

A mixture of 50 g of poly(4-vinyl-1-methylpyridinium chloride), 350 ml of water and 5 g of sponge nickel was pressurized with hydrogen to 900 p.s.i.g. and then heated to 175° C. Further hydrogen was added as necessary to keep the pressure above 1,000 p.s.i.g. During 7 hours 82% of the theoretical amount of hydrogen was taken up. The vessel was cooled and vented and the catalyst was removed by filtration. Evaporation of the solvent yielded a solid material. The n.m.r. spectrum, as in Example 3, demonstrated that most, i.e., over at least about 80%, of the pyridinium rings in the starting polymer had been reduced to piperidinium rings.

EXAMPLE 5

A mixture of 50 g of poly(4-vinyl-1-methylpyridinium chloride), 350 ml of water and 0.65 g of ruthenium dioxide hydrate was pressurized with hydrogen to 700 p.s.i.g. and then heated to 170° C. Further hydrogen was added as necessary to keep the pressure above 1,000 p.s.i.g. During 8 hours 85% of the theoretical amount of hydrogen was taken up. The vessel was cooled and vented and the catalyst was removed by filtration. Evaporation of the solvent yielded a solid material. The n.m.r. spectrum of a sample, as in Example 3, demonstrated that most, i.e., over at least about 80%, of the pyridinium rings in the starting polymer had been reduced to piperidinium rings.

EXAMPLE 6

A 20 g sample of poly(4-vinylpyridine), quaternized to the extent of about 90% with ethyl bromide, 350 ml of water and 5 g of 5% palladium on carbon was hydrogenated as in Example 1. The n.m.r. spectrum of the product demonstrated that most, i.e., over at least about 80%, of the pyridinium rings in the starting polymer had been reduced to piperidinium rings.

EXAMPLE 7

A sample of poly(4-vinylpyridine) quaternized to the extent of about 75% with methyl chloride was hydrogenated as in Example 1 except that a temperature of 100°–120° C. and operating pressure of 2,000–2,500 p.s.i.g. were maintained for a period of 4 hours. The n.m.r. spectrum of the product demonstrated that approximately all of the quaternized pyridinium rings in the starting polymer had been reduced to piperidinium rings.

EXAMPLE 8

A sample of the poly(4-vinyl-1-methylpiperidinium chloride) prepared as in Example 1 was dissolved in water and was added slowly to concentrated aqueous sodium hydroxide. A precipitate formed and was identified as poly(4-vinyl-1-methylpiperidine), substantially identical with the material prepared in Example 2.

EXAMPLE 9

A 20 g sample of poly(4-vinylpyridine), quaternized to the extent of about 95% with butyl bromide, 350 ml of water and 5 g of sponge nickel was hydrogenated as in Example 1 except that a temperature of 125° C. and operating pressure of 2,500–3,000 p.s.i.g. were maintained for a period of 5 hours. The n.m.r. spectrum of the product demonstrated that over at least about 90% of the pyridinium rings in the starting polymer had been reduced to piperidinium rings.

EXAMPLE 10

A 20 g sample of poly(4-vinylpyridine), quaternized to the extent of about 70% with octyl bromide, 350 ml of methanol and 5 g of 5% ruthenium on carbon was hydrogenated as in Example 1. The n.m.r. spectrum of the product demonstrated that approximately the entire 70% of the quaternized pyridinium rings in the starting polymer had been reduced to piperidinium rings.

EXAMPLE 11

A 20 g sample of poly(4-vinylpyridine), quaternized to the extent of about 70% with decyl bromide, 350 ml of methanol and 5 g of 5% ruthenium on carbon was hydrogenated as in Example 1. The n.m.r. spectrum of the product demonstrated that approximately the entire 70% of the quaternized pyridinium rings in the starting polymer had been reduced to piperidinium rings.

EXAMPLE 12

A mixture of 50 g of poly (4-vinyl-1-methylpyridinium chloride), 350 ml of water and 5 g of 5% platinum on carbon was pressurized with hydrogen to 950 p.s.i.g. and then heated to 190° C. No further hydrogen was added. During 8 hours 18% of the theoretical amount of hydrogen was taken up. The vessel was cooled and vented and the catalyst was removed by filtration. Evaporation of the solvent yielded a solid material. The n.m.r. spectrum of a solution of a sample of this material showed a significantly decreased relative intensity of the peaks in the region of 6 to 9 p.p.m. downfield from tetramethylsilane as compared with the spectrum of the starting material, demonstrating that a substantial number, i.e., approaching the theoretical 18%, of the pyridinium rings in the starting polymer had been reduced to piperidinium rings.

EXAMPLE 13

A 20 g sample of poly(4-vinylpyridine) quaternized to the extent of about 70% with cetyl bromide, 350 ml of methanol and 5 g of 5% ruthenium on carbon was hydrogenated as in Example 1. The n.m.r. spectrum of the product demonstrated that approximately the entire 70% of the quaternized pyridinium rings in the starting polymer had been reduced to piperidinium rings.

EXAMPLE 14

A sample of poly(5-vinyl-2-methyl-1-methylpyridinium chloride) was hydrogenated as in Example 1. Evaporation of the solvent yielded a solid material which was identified as poly(5-vinyl-2-methyl-1-methylpiperidinium chloride). The n.m.r. spectrum of a solution of a sample of this material showed the absence of peaks in the region 6 to 9 p.p.m. downfield from tetramethylsilane, as in Example 1.

EXAMPLE 15

A sample of poly(2-vinyl-1-methylpyridinium chloride) was hydrogenated as in Example 1. Evaporation of the solvent yielded a solid material which was identified as poly(2-vinyl-1-methylpiperidinium chloride). The n.m.r. spectrum of a solution of a sample of this material showed the absence of peaks in the region 6 to 9 p.p.m. downfield from tetramethylsilane, as in Example 1.

EXAMPLE 16

A solution was prepared consisting of 36.0 g of Niax Polyol LG-56, which is marketed by Union Carbide, and 0.1 g of tin octoate. Three tenths of a milliliter of a methanolic 1% solution of poly(4-vinyl-1-methylpiperidine) prepared as in Example 2 was added and mixed well with 4.0 g of the polyol mixture. Two grams of toluene diisocyanate was added and the mixture stirred vigorously until foaming began. The mixture was allowed to cure for 1 hour at 60°–70° C. and produced a flexible urethane foam which is useful as padding and upholstery matrials and the like. In view of the chemistry involved, it is anticipated that all N-substituted polyvinylpiperidines within the formula defined as applicants' invention will function similarly as urethane catalysts in procedures similar to this one.

EXAMPLE 17

One half milliliter of a 1% methanolic solution of poly(4-vinyl-1-methylpiperidine) prepared as in Example 2 was mixed thoroughly with 1 gram of the epoxy resin DER-331, which is marketed by Dow Chemical Company. After curing for 8 hours at 60°–70° C., a hard tough polymer was produced. As in Example 11, it is anticipated that all N-substituted polyvinylpiperidines within applicants' defined invention will function similarly as suitable epoxy resin catalysts in procedures similar to this one.

We claim:

1. A polymer composition comprised substantially of monomeric units having the formula

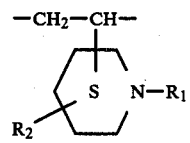

or its acid salt, wherein:
$R_1$ is an alkyl group having from 1 to about 20 carbon atoms or an arylalkyl group having from 7 to about 12 carbon atoms; and
$R_2$ is hydrogen or an alkyl group having from 1 to about 10 carbon atoms.

2. The composition of claim 1 in which $R_1$ is a methyl group.

3. The composition of claim 1 in which $R_2$ is hydrogen.

4. The composition of claim 3 in which $R_1$ is a methyl group.

5. The composition of claim 4 in which the monomeric unit is 2-vinyl-1-methylpiperidine.

6. The composition of claim 4 in which the monomeric unit is 4-vinyl-1-methylpiperidine.

7. The composition of claim 3 in which $R_1$ is a butyl group.

8. The composition of claim 1 in which $R_2$ is a methyl group.

9. The composition of claim 8 in which $R_1$ is a methyl group.

10. The composition of claim 9 in which the monomeric unit is 5-vinyl-2-methyl-1-methylpiperidine.

11. The composition of claim 1 in which $R_2$ is an ethyl group.

12. The composition of claim 11 in which $R_1$ is a methyl group.

13. The composition of claim 12 in which the monomeric unit is 2-vinyl-5-ethyl-1-methylpiperidine.

14. The composition of claim 1, 2, 3, 8 or 11 in which the acid salt is a chloride, bromide, iodide or methylsulfate.

15. The composition of claim 1, 2, 3, 8 or 11 in which the molecular weight of the polymer is about 1,000 or more.

16. A process for preparing a polymer composition comprised substantially of monomeric units having the formula

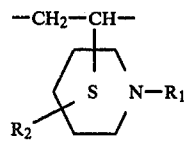

or its acid salt, wherein:
$R_1$ is an alkyl group having from 1 to about 20 carbon atoms or an arylalkyl group having from 7 to about 12 carbon atoms;
$R_2$ is hydrogen or an alkyl group having from 1 to about 10 carbon atoms; and
Y is an anion,
comprising the step of hydrogenating an amount of the quaternary salt of the pyridine precursor of the polymer in the presence of a hydrogenation catalyst selected from the Group VIII metals to produce the acid salt of the polymer.

17. The process of claim 16 comprising the additional step of reacting the acid salt with a basic material to produce the free base of the polymer.

18. The process of claim 17 in which said hydrogenating and said reacting occur without significant reduction in molecular weight of the prepared polymer.

19. The process of claim 17 in which said reacting includes combining the acid salt with the basic material and causing the resultant mixture to be at a temperature sufficiently high and for such a length of time as to cause substantial neutralization to occur.

20. The process of claim 19 in which said combining is with sodium hydroxide.

21. The process of claim 20 in which said causing is for a period of time sufficient to provide a yield of at least about 80%.

22. The process of claim 21 in which said causing is to a temperature of about 5°–150° C.

23. The process of claim 22 in which said causing is for a period of at least about thirty minutes and to a temperature of about 100° C.

24. The process of claim 16, 17 or 23 in which said hydrogenating is at least about 90% complete.

25. The process of claim 24 in which the hydrogenation catalyst is nickel or ruthenium.

26. The process of claim 16, 17 or 23 in which said hydrogenating is at least about 80% complete.

27. The process of claim 26 in which said hydrogenating is at an operating pressure of about 300–3,000 p.s.i.g.

28. The process of claim 26 in which said hydrogenating is at a temperature of about 100°–200° C.

29. The process of claim 26 in which said hydrogenating is for a period of about 4–8 hours.

30. The process of claim 26 in which said hydrogenating is in the presence of a nonacid solvent.

31. The process of claim 30 in which the nonacid solvent is water.

32. The process of claim 30 in which the nonacid solvent is an alcohol.

33. The process of claim 30 in which $R_1$ is a methyl group.

34. The process of claim 30 in which $R_2$ is hydrogen.

35. The process of claim 34 in which $R_1$ is a methyl group.

36. The process of claim 35 in which the monomeric unit is 2-vinyl-1-methylpiperidine.

37. The process of claim 35 in which the monomeric unit is 4-vinyl-1-methylpiperidine.

38. The process of claim 34 in which $R_1$ is a butyl group.

39. The process of claim 30 in which $R_2$ is a methyl group.

40. The process of claim 39 in which $R_1$ is a methyl group.

41. The process of claim 40 in which the monomeric unit is 5-vinyl-2-methyl-1-methylpiperidine.

42. The process of claim 30 in which $R_2$ is an ethyl group.

43. The process of claim 42 in which $R_1$ is a methyl group.

44. The process of claim 43 in which the monomeric unit is 2-vinyl-5-ethyl-1-methylpiperidine.

45. The process of claim 30 in which the acid salt is a chloride, bromide, iodide or methylsulfate.

46. The process of claim 30 in which the molecular weight of the polymer is about 1,000 or more.

* * * * *